Patented Apr. 13, 1943

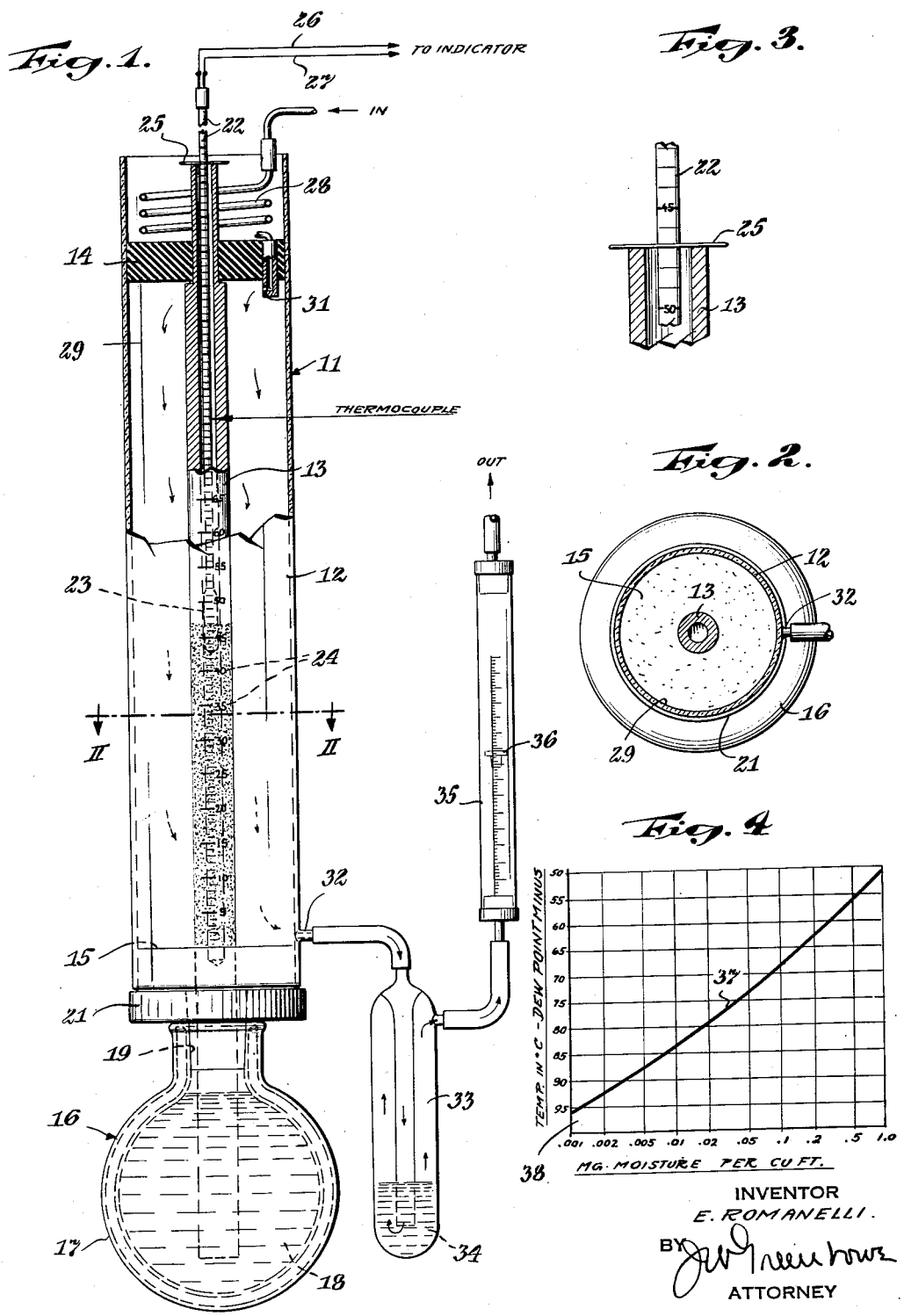

2,316,624

UNITED STATES PATENT OFFICE 2,316,624

APPARATUS FOR DETERMINATION OF MOISTURE IN GASES

Emilio Romanelli, Bloomfield, N. J., assignor to Westinghouse Electric & Manufacturing Company, East Pittsburgh, Pa., a corporation of Pennsylvania Application September 30, 1939, Serial No. 297,221

10 Claims. (Cl. 73—51)

This invention relates to the accurate determination of the moisture content of gases, and more particularly to apparatus whereby the moisture content of a gas is indicated as it flows along in a continuous stream.

The principal object of my invention, generally considered, is the determination of the moisture content of a gas while it is flowing along in a stream, by finding the temperature at which the moisture therein just starts to precipitate as dew or frost on a thermally conductive element.

Another object of my invention is the determination of the moisture in gases by passing the gas to be tested through a tube containing a mirror-polished metal rod or tube, one end of which is cooled in order to provide a temperature gradient therealong, so that moisture from the gas will start to deposit at some place along the rod or tube that is visible, and the temperature of it may be measured to show what may be considered as the dew point of the gas, although if the moisture content is very low, the deposit will be in the form of frost rather than dew.

A further object of my invention is the determination of the moisture content in a gas, by passing the same through a glass tube containing a mirror-polished metal rod or tube, one end of said rod or tube, being immersed in liquid air, or other cooling medium, said gas passing out of said tube through a trap and into a flow gauge, said rod or tube containing a thermocouple which is moved to the point where moisture first starts to deposit along said rod for determining the maximum temperature causing such deposit as a measure of the dew point of said gas.

A still further object of my invention is the provision of apparatus for measuring the moisture content in gases, comprising a transparent tube through the center of which passes a hollow mirror-polished graduated metal rod or tube, one end of said tube being immersed in liquid air, or other cooling medium, a thermocouple adjustably mounted in said rod so as to be positioned at the proper place to determine where moisture first starts to condense on said rod or tube, means for introducing gas into the end of said tube away from said cooling medium and withdrawing it from near said cooling medium, a trap into which said gas passes to prevent reversal of flow and diffusion of moisture into the test instrument, and a flow meter through which said gas passes after leaving said trap, in order to make it possible to pass gas through the apparatus at a fairly uniform rate of speed.

Other objects and advantages of the invention, relating to the particular arrangement and construction of the various parts, will become apparent as the description proceeds.

Referring to the drawing illustrating my invention:

Figure 1 is an elevational view, partly in vertical section, of apparatus embodying my invention.

Figure 2 is a horizontal sectional view on the line II—II of Figure 1, in the direction of the arrows.

Figure 3 is an enlarged fragmentary view of the upper portion of the graduated tube and the corresponding part of the thermocouple.

Figure 4 is a chart for use in determining the moisture content of the gas, in milligrams per cubic foot, from the thermocouple reading of the temperature at which moisture first starts to deposit.

Referring to the drawing in detail, like parts being designated by like reference characters, the apparatus 11 embodying my invention for determining moisture content of gases, comprises an envelope or tube 12 formed of glass or other transparent material, and through which passes a mirror-polished metal rod or tube 13, which rod is desirably axially disposed. The hollow rod 13 is desirably formed of copper, brass or other highly conductive material, plated with chromium, nickel or other similar highly reflective metal. The tube 13 is desirably held in position in the envelope 12 by plugs 14 and 15 through which the ends of said tube 13 pass.

The lower end of the tube 13 passes into a cooling device 16, which may comprise a vacuum walled glass bottle 17, containing liquid air 18, and closed by a stopper 19 having an enlarged head 21 supporting the envelope 12, and through which the lower end of said tube 13 passes.

Received in the tube 13, is a thermocouple 22, the lower end of which terminates in a bulb 23 containing the active measuring elements. The thermocouple has a stem in the form of a tube desirably graduated to correspond with the graduations 24 on the hollow rod 13, said graduations, however, being in the reverse order, as illustrated in Figure 3, in order that the relationship between them and a frictionally supporting disc 25, will show the position of the bulb 23 along the metal tube 13, so that said bulb may be placed to accurately measure the temperature of the tube 13 at any desired point. The thermocouple is connected to a millivoltmeter, or other suitable measuring instrument, not shown, by means of conductors 26 and 27.

In order to introduce the gas, the moisture content of which is to be determined, to the instrument 11, I preferably provide a coil 28 of tubing, desirably formed of copper or other highly conductive material, through which the gas circulates before it enters the chamber 29 formed between the envelope 12 and the tube 13, so that it will be appreciably reduced in temperature and reach approximately that of the top or warmest part of said chamber before it is actually introduced thereinto. The gas is discharged into the chamber 29 through an orifice 31 in a direction preferably radial, so that its entering velocity axially of said chamber is nil, whereby it gradually, without much agitation, works along the rod 13, from the warmer end thereof toward the end cooled by the refrigerant 18, and finally passes out of the envelope 12 through the outlet 32 into a mercury trap 33, where it bubbles through mercury 34 contained therein, and then passes out and on through a flow meter 35, containing an indicator 36 which shows the rate of flow of said gas. The gas being tested may be at approximately atmospheric or other desired pressure. The inner tube of the trap 33 need dip into the mercury only a small amount, say about one-half inch or not much more than ten millimeters. So if the gas discharging from the flow meter 35 is at atmospheric pressure, that of the gas in the coil 28 need not be much more than 770 mm. By adjusting the inlet valve, not shown, in the gas line 26, said gas may be caused to flow at any desired rate of speed through the apparatus, while readings on the indicator are taken.

A method of using the apparatus described, for determining the moisture content of a gas, is as follows:

The container 17 is filled with a cooling medium such as liquid air, dry ice, or other appropriate medium, the lower end of the rod 13 immersed thereinto, and the apparatus allowed to stand until the rod has reached approximate thermal equilibrium. The gas to be tested is then admitted to the tube 12, and allowed to flow slowly therealong, as shown by the indicator 36 of the flow meter 35. At some point along the graduated tube 13, which in the present embodiment is represented by the graduation at 47, dew or frost will start to deposit thereon and extend to the bottom or cold end of said tube. In other words, the moisture will start at the bottom, or coldest portion of the tube 13, and travel therealong to some point where said tube will not be cold enough to condense moisture. The temperature at this point is the dew point. Whether the deposit is dew or frost depends on the amount of moisture in the gas. If the amount is very great, the significant deposit will be dew, that is, the dew point will be above 0° C., and if small, it will be frost, that is, the dew point will be below 0° C.

The thermocouple 22 is adjusted so that its bulb 23 is deposited exactly at the place where this moisture deposit starts, by moving it until the same graduation number, 47 in this instance, is indicated where the tube 22 passes through the supporting plate 25. After equilibrium has been reached, a reading of the thermocouple temperature indicator shows the dew point of the gas passing through the instrument, and a reference to the chart of Figure 4, will then directly give the moisture content in milligrams per cubic foot. Of course this chart is properly calibrated to agree with the apparatus used, in accordance with well known practice.

Suppose, for example, that the thermocouple reading shows that the dew point is at a temperature of minus 68° C. A reference to the chart will show that this dew point temperature corresponds with a moisture content of 0.1 milligram per cubic foot. In the same way, a dew point temperature reading of minus 84° C. corresponds with a moisture content of .01 milligram per cubic foot.

Inasmuch as I have designed my apparatus primarily for measuring the moisture content in argon and other gases used in the manufacture of gas-filled lamps, and inasmuch as the moisture content of such gases must necessarily be very low in order to be suitable for the purpose, it will be found that the moisture will always start to deposit as frost because of the fact that the dew point is much below the freezing temperature of water for gas containing such minute quantities of moisture.

From the foregoing disclosure, it will be seen that I have devised apparatus for determining the moisture content in gases, which is particularly adapted for testing such gases used in making gas filled lamps where the moisture content is extremely small, said method consisting in establishing a suitable thermal gradient along a mirror-polished conducting rod, causing the gas to be measured to flow slowly along said rod, accurately measuring the temperature at which moisture first starts to precipitate along said rod, and reading the moisture content from a properly calibrated chart.

In view of the character of the curve 37 of the chart 38, said chart is formed with a moisture content shown on a logarithmic scale in order to make the curve more nearly approach a straight line and thereby facilitate the plotting and reading thereof.

It will be understood that by virtue of my invention I have made it possible to directly determine the amount of moisture in the gas without any substantial time delay, as compared with previous methods of moisture determination where a delay of approximately twenty-four hours was necessary in order to accumulate enough moisture to accurately determine the moisture content, where said content was extremely low, as in the case of gas used in the manufacture of lamps.

Although a preferred embodiment of my invention has been disclosed, it will be understood that modifications may be made within the spirit and scope of the appended claims.

I claim:

1. Apparatus for determining the amount of moisture in gas, comprising a transparent envelope through which gas may be conducted, a graduated heat-conductive element disposed in said envelope, cooling means at one end of said element providing a temperature gradient therealong, and means for determining the temperature at a point along said graduated element selected in accordance with where moisture stops condensing along said element.

2. Apparatus for determining the amount of moisture in gas, comprising a transparent envelope through which gas may be conducted, a mirror-polished tubular metal rod disposed in said envelope, means for maintaining a thermal gradient along said rod, means for flowing the gas to be tested along said rod, and means slidable in said rod for accurately measuring the temperature at the point, varying with the moisture content of the gas, at which such moisture stops condensing on said rod.

3. Apparatus for determining the amount of moisture in gas, comprising a transparent envelope through which gas may be conducted, a mirror-polished heat-conducting rod disposed in said envelope, means for maintaining a thermal gradient along said rod, and means for accurately measuring the temperature at which moisture stops condensing along said rod.

4. Apparatus for determining the amount of moisture in gas, comprising a transparent envelope through which gas may be conducted, a mirror-polished rod disposed in said envelope, a quantity of liquid air in which one end of said rod is immersed, and means for determining the temperature at the point on said rod to which moisture extends therealong from its colder end.

5. Apparatus for determining the amount of moisture in gas, comprising a transparent envelope through which gas may be conducted, a conductive tube disposed in said envelope, means for cooling one end of said tube to maintain a thermal gradient therealong, means movable in said tube for measuring the temperature at the point, varying with the moisture content of the gas, at which moisture stops condensing on said tube, and a flow meter disposed in series with said envelope for indicating the rate of flow of gas through said apparatus.

6. Apparatus for determining the amount of moisture in gas, comprising a transparent envelope through which gas may be conducted, a graduated heat-conductive tube disposed in said envelope, a thermocouple provided with a correspondingly graduated stem and movably mounted in said tube, and means for cooling one end of said tube to provide a temperature gradient therealong, the graduations on said thermocouple stem corresponding with those on said tube so that said stem may be moved to an indicated desired position, for measurement of the temperature at a selected point on said tube.

7. Apparatus for determining the amount of moisture in gas, comprising a transparent envelope through which gas may be conducted, a heat conductive element having a specular surface disposed in said envelope, means for maintaining a thermal gradient along said element, and means movable along said heat-conductive element when equilibrium is reached for then determining the temperature at the point on said surface to which condensed moisture thereon extends from its colder end.

8. Apparatus for determining the amount of moisture in gas, comprising a transparent tube through which gas may be conducted, a heat-conductive element in said tube, means for cooling the end of said element remote from the point of gas inlet so as to provide a decreasing temperature gradient therealong, and means for determining the temperature on said element at the point where moisture just stops condensing from the gas, as an indication of the moisture content in said gas.

9. Apparatus for determining the amount of moisture in gas, comprising a transparent tube, a heat-conductive element therein, a flow meter connected to said tube, means for admitting gas at one end of, and passing it through said tube along said conductive element and through said flow meter in order to indicate the rate of flow of said gas, means for cooling the end of said conductive element remote from the point of admission of said gas to establish a temperature gradient therealong, and means for determining the temperature of said element at the point thereon at which moisture stops condensing.

10. Apparatus for determining the amount of moisture in gas, comprising a transparent envelope, a heat-conductive tube therein, means for admitting gas radially at one end of, and passing it through, said envelope along said tube, means for cooling the end of said tube remote from the point of gas admission to provide a temperature gradient therealong, and a thermocouple disposed in said envelope, said thermocouple having a portion extending beyond said envelope for moving the former until positioned at exactly the point at which moisture stops condensing on said tube for there reading the temperature.

EMILIO ROMANELLI.